United States Patent Office 2,927,864
Patented Mar. 8, 1960

2,927,864

FLEXIBLE COATING COMPOSITIONS FOR METAL

James A. Shotton, Bartlesville, Okla., assignor to Phillips Petroleum Company, a corporation of Delaware No Drawing. Application July 8, 1957
Serial No. 670,382

13 Claims. (Cl. 106—287)

This invention relates to flexible coating compositions for metal.

Various coating compositions have been prepared in the past for the purpose of protecting metal surfaces. These coatings were developed to protect metal surfaces from various types of corrosion such as rusting, galvanic action, and chemical action. A large amount of work has been carried out in the field of coatings, in particular with respect to coatings for surfaces which will come into contact with food and beverages, i.e., coatings for the interior surfaces of food and beverage cans.

Satisfactory can coatings should have the properties of good flexibility, good adhesion after the canned contents are processed, good hardness, and excellent resistance to sulfide staining. Good flexibility is necessary because the metal plate is coated with the coating material before the can is fabricated and the coating must withstand the stresses to which it is subjected during fabrication. A reasonable degree of hardness is desired since the fabricating machinery is prone to scratch the coating. Satisfactory can coatings should have a pencil hardness of at least 3 and it is, therefore, preferred to provide coating compositions which will bake to such a pencil hardness. When the contents of the can, such as food, are processed, the coating should have good adhesion after processing since the public is not likely to buy canned food or beverages containing small particles of the coating. Since the metals from which cans are fabricated are subject to sulfide staining, coatings must remain in the form of continuous, adherent films to protect the metals from contact with sulfur containing compounds in foods, etc.

Liquid polymers of conjugated dienes such as liquid polybutadiene and such conjugated dienes polymerized with copolymerizable monomers such as styrene, methyl substituted styrenes, acrylonitrile, methyl methacrylate, and the like, have come into prominence in recent years as coating materials. While such coatings from these materials have numerous advantages, they are, in many instances, deficient in flexibility with regard to fabrication, and for this reason, coatings of food containers lined therewith are frequently damaged in fabricating operations.

I have discovered that coatings with improved flexibility can be prepared using a polymer prepared from a mixture of monomers, such as a mixture of a major amount of butadiene and a minor amount of 2-methyl-5-vinylpyridine. Liquid polymers prepared from such a monomer system have the required degree of hardness and are, surprisingly, more flexible than coatings comprising homopolymers of butadiene or copolymers of butadiene with other monomers.

The following are objects of my invention.

An object of my invention is to provide new coating compositions. A further object of my invention is to provide can coating compositions which will withstand fabrication and food processing. A further object of my invention is to provide tin plate coated with the new compositions of my invention. A further object of my invention is to provide can coating compositions comprising a mixture of a homopolymer of a conjugated diene and a polymer prepared by polymerizing a monomer mixture comprising a conjugated diene and copolymerizable vinyl or alpha-methylvinyl substituted pyridine or quinoline.

Other objects and advantages of this invention will become apparent to one skilled in the art upon reading the accompanying disclosure.

Broadly, my improved composition comprises a liquid polymer prepared by polymerizing, based on 100 parts by weight of monomers, 70 to 98 parts of a conjugated diene containing 4 to 8 carbon atoms and 30 to 2 parts of a compound of the pyridine and quinoline series containing a

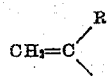

substituent where R is selected from the group consisting of hydrogen and methyl, said liquid polymer having a viscosity in the range of 100 to 6000 Saybolt Furol seconds at 100° F. For application, such a liquid polymer is mixed with a hydrocarbon solvent boiling in the range of 175 to 400° F., the amount of said solvent generally being sufficient to give a solution containing 10 to 70 percent by weight of non-volatile matter. Furthermore, such liquid copolymers can be mixed with a liquid homopolymer of a 4 to 12 carbon containing diene in order to improve the flexibility of a coating using the liquid diene homopolymer.

As those skilled in the art will understand, the conjugated dienes which can be employed are, in addition to 1,3-butadiene, those which contain from 4 to 8, inclusive, carbon atoms per molecule and include isoprene (2-methyl-1,3-butadiene), piperylene, 2-methyl-1,3-pentadiene, 2,3 - dimethyl - 1,3 - butadiene, chloroprene, and others. With a greater number of carbon atoms, the polymerization rate decreases somewhat, and there are so many isomers that it is not practical, with present procedures, to provide pure compounds. However, in a broader aspect of the invention, conjugated dienes having more than 8, such as 12, carbon atoms per molecule can be used, particularly where the presence of various isomeric compounds can be tolerated. Furthermore, various alkoxy, such as methoxy and ethoxy, and cyano derivatives of these conjugated dienes, are also applicable. Thus dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, and 2,3-diethyl-1,3-octadiene are applicable. Dienes containing 4 to 6 carbon atoms are preferred.

The heterocyclic nitrogen bases which are applicable are those of the pyridine and quinoline series which are copolymerizable with a conjugated diene and contain one

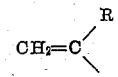

substituent wherein R is either hydrogen or a methyl group, i.e., the substituent is either a vinyl or an alpha-methylvinyl (isopropenyl) group. The vinyl-substituted heterocyclic nitrogen bases of the pyridine and quinoline series which are preferred are those having only one

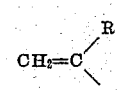

substituent and of these compounds, those belonging to the pyridine series are most frequently used. Various alkyl-substituted derivatives can also be used but it is generally preferred that the total number of carbon atoms in the nuclear-substituted groups, in addition to the vinyl or alpha-methylvinyl, should not be greater than 12 and most frequently these alkyl substituents are methyl and/or ethyl.

These heterocyclic nitrogen bases have the formula

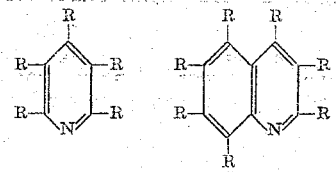

or

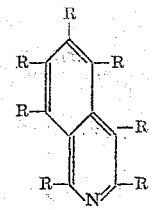

where R is selected from the group consisting of hydrogen, alkyl, vinyl, alpha-methylvinyl, alkoxy, halo, hydroxy, cyano, aryloxy, aryl, and combinations of these groups such as haloalkyl, alkaryl, hydroxyaryl, and the like; one and only one of these groups being selected from the group consisting of vinyl and alpha-methylvinyl; and the total number of carbon atoms in the nuclear substituted groups, in addition to the vinyl or alpha-methylvinyl group, being not greater than 12. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl) - 3 - vinyl - 4 - methylpyridine; 3 - vinyl - 5 - (hydroxyphenyl)pyridine; 2-vinylquinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The liquid polymers employed in my invention are those which have a viscosity between 100 and 6000 Saybolt Furol seconds at 100° F. Improved can coatings can be obtained by polymerizing by either mass or emulsion polymerization although I prefer to use polymers prepared by mass polymerization in the presence of an alkali metal catalyst, a suitable method for such polymerization being that described in Crouch 2,631,175. When emulsion polymerization is used, standard synthetic rubber recipes are used except for the inclusion in the recipe of larger amounts of the mercaptan modifier. Suitable liquid polymers can be obtained using 2 to 7 parts of a mercaptan modifier such at tertiary-dodecyl mercaptan.

The polymeric coating material is conveniently prepared in the form of a solution which can be applied to metal surfaces by means of roller coating, spraying, brushing, or dipping. Suitable solvents include both aromatic and aliphatic hydrocarbons, some examples of which are toluene, xylene, benzene, Stoddard solvent, mineral spirits, naphtha, and the like. The amount of solvent used will vary, depending upon such factors as the nature of the polymers employed and the method of application to metal surfaces. Generally, the amount of solvent is adjusted to give a solution containing in the range between 10 and 70 percent by weight of non-volatile matter.

Other ingredients are frequently incorporated in the coating compositions. For instance, when used as coatings for food containers, particularly when food containing sulfur is to come in contact with the metal surface, zinc oxide can be added to the composition in order to improve the resistance to decolorization of the coating. Pigments and driers can also be present if desired, metal naphthenates being the commonly used driers.

Following the application of the coating composition, the metal surface is dried or baked at a temperature in the range between room temperature (around 65° F.) and 900° F. When driers are present, lower temperatures in the range can be employed, room temperature being sufficient in some instances. As the baking temperature is increased, the time of baking can be shortened. The time can vary in the range between 2 seconds and 8 hours, although most practice today is in the range of 3 to 30 minutes at temperatures of 350 to 450° F., most of my work being done in this range.

The compositions herein described are particularly suitable for coating sheet metal such as tinned plate, terne plate, bonderized steel, or other thin metal sheets used in making metal containers for storing food, beer, oil, and other products. These compositions are applicable for inside and outside protective coatings or as base coatings for lithographing exterior surfaces of containers or as base coatings for wax-lined beer cans.

The amount of coating composition which should be applied, i.e., the film weight, will vary depending upon the type of surface which is to be protected. When thin metal surfaces are to be protected, such as the metal for cans, it is preferable that the film weight be low. In such instances it will generally be in the range between one and ten milligrams per square inch. Heavier coatings, say up to 25 milligrams per square inch or higher, can be employed for other uses, e.g., application to pipes.

As will be seen in the examples, a small amount of the copolymer, when mixed with a liquid homopolymer of butadiene, provides a coating which is much more flexible than the original homopolymer. When such a mixture is used, it is preferred that the copolymer of the diene/vinylpyridine type comprise at least one third of the total weight of the mixture.

The following examples set forth specific coating compositions prepared according to the method of my invention although, obviously, the invention is not specifically limited thereto.

*Example 1*

Two butadiene/2-methyl-5-vinylpyridine liquid copolymers were prepared using finely divided sodium as the catalyst and a solvent containing approximately 3.5 liquid volume percent toluene, 35 percent normal heptane, 45 percent $C_7$ naphthenes, and 16 percent isoheptanes and isooctanes. The sodium dispersions were prepared in a laboratory dispersion apparatus using an iso paraffinic hydrocarbon solvent having a boiling range of 350 to 406° F. (Soltrol 130) as the dispersion medium. The average particle diameter of the dispersed sodium was about 8 microns.

The reactor employed for the production of the copolymers was a 2-gallon stainless steel pot equipped with a mechanical stirrer, heating and cooling coils, gage glass, thermowell, and miscellaneous auxiliary parts needed to introduce the charge materials and to withdraw the product. During operation, the temperature of the reactor was maintained at the desired level with the aid of a portable Wheelco indicating-type temperature controller. A record of the temperature was made with a Brown potentiometer-type recorder.

Butadiene, 2-methyl-5-vinylpyridine, and the solvent were premixed in a cylinder, the butadiene plus 2-methyl- 5-vinylpyridine comprising 40 weight percent of the charge. The mixture of monomers and solvent was fed to the reactor through a Fischer-Porter rotometer with the aid of nitrogen gas pressure. The feed rate was adjusted so that the reactor pressure was 30 to 35 p.s.i.g. The feed rate was normally about one gallon per hour. Sodium dispersed in the isoparaffinic solvent was fed to the reactor at approximately 30 minute intervals. One weight percent sodium, based on the butadiene in the charge, was used in each run.

The reaction products were contacted with methanol, in a 5-liter vessel provided with a stirrer, and then with dilute sulfuric acid and water in a two-stage washer consisting of two 5-liter mixing flasks, each equipped with a heating mantle, turbine-type agitator, and a phase separator. Both wash vessels were maintained at 140 to 150° F. The washed product was stripped to about 80 percent polymer (20 percent solvent) at atmospheric pressure. Stripping was completed at 1 to 5 mm. of mercury absolute pressure in a Rinco rotating evaporator using an oil bath at 300° F. to supply the heat required for the operation.

Synthesis data properties of the two copolymers are shown below.

|  | Run 1 | Run 2 |
|---|---|---|
| Synthesis Conditions: |  |  |
| Temperature, ° F | 185 | 195 |
| Pressure, p.s.i.g | 30 | 35 |
| Sodium, wt. percent [1] | 1.0 | 1.0 |
| 2-methyl-5-vinylpyridine in charge, wt. percent [1] | 2.5 | 5.0 |
| Properties of Polymer: |  |  |
| Viscosity, SFS at 100° F | 3,841 | 2,179 |
| Ash, wt. percent | 0.005 | 0.002 |
| Volatile, wt. percent | 0.22 | 0.14 |
| Color, Gardner | 14 | 15 |
| Combined 2-methyl-5-vinylpyridine, wt. percent | 2.96 | 5.51 |

[1] Based on the butadiene.

Each of the butadiene/2-methyl-5-vinylpyridine copolymers was used to prepare a coating composition by adding 200 grams of an aromatic solvent (Solvesso 100) to 300 grams of the copolymer. The solvent consists primarily of xylenes and is similar in boiling range to mineral spirits.

The coating compositions thus obtained were applied with a roller coater to one side of several specimens of electrolytic tin plate and the coated specimens were then baked 13 minutes at 400° F.

The coated plates were tested for flexibility by punching from them No. 303 can ends. Results were determined by placing each can end in 5 percent copper sulfate solution, to which a few drops of sulfuric acid was added, for two minutes to develop fractures of the coating, after which the specimen was washed with tap water. The etched ends were compared with rated ends supplied by Continental Can Company. This punch press test is a measure of applicability for fabrication, a rating of 100 being perfect while a rating of 0 has continuous breaks in the coating.

The specimens were tested for pencil hardness by finding the pencil of a specific hardness which would scratch the film when the specimens were written on under normal writing pressure.

The coated specimens were also tested for durability under food processing conditions using dog food and oxygenated spinach. In the dog food test, the coated specimens were embedded in a can of dog food which was half full, and the cans were sealed and processed in a pressure cooker under 15 p.s.i.g. steam pressure (250° F.).

After 90 minutes of processing the cans were removed, and after standing for 24 hours at room temperature, they were opened and a determination of the properties of the coating composition was made. The adhesion of the coating to the metal was determined by sticking a piece of "Scotch" brand cellophane tape to the coating and quickly stripping it off, 100 representing no loss and lower figures representing the percent of coating not removed. The amount of stain was visually determined, 100 representing no stain and 0 being completely stained.

In the oxygenated spinach test, the spinach was pureed and this puree was used to fill No. 2 cans half full. Coated test strips 1½ inches wide and 4 inches long were placed in each can in such a manner that half of each strip was embedded in the spinach. The can was sealed with a top, a hole was punched in the top, and the can was placed in a vacuum desiccator. The can was then evacuated and oxygen was forced into the can by alternately pulling a vacuum on the desiccator and bleeding in pure oxygen. This oxygen introduction was carried out 3 times, after which the can was removed from the desiccator. The hole in the top was sealed by soldering, and the cans processed in a pressure cooker at 240° F. After 60 minutes of processing the cans were removed, and after standing four days at room temperature, they were opened and the physical properties of the coatings were determined. The adhesion of the coating to the metal was determined by severely rubbing the coating between the thumb and the forefinger, using a rubber thumb stall.

Additional samples of tin plate were coated with liquid polybutadiene having a viscosity of 2500 Saybolt Furol seconds at 100° F. and a Gardner color of 11 prepared by sodium catalyzed polymerization and with two commercial varnishes, Du Pont VC 8116 and Continental 70. These specimens were baked 13 minutes at 400° F. and the resulting coatings tested for flexibility (punch press test, No. 303 can ends) and pencil hardness.

Results from all tests are shown below:

|  | 1,3-Butadiene/ 2-methyl-5-vinyl-pyridine Copolymers | | Liquid Poly-butadiene | Commercial Varnish | |
|---|---|---|---|---|---|
|  | Run 1 | Run 2 |  | du Pont VC 8116 | Continental 70 |
| Film wt., mg./sq. in | 5.2 | 5.5 | 4.9 | 5.3 | 4.7 |
| Pencil hardness | 4H | 3H | 5H | 5H | 5H |
| Fabrication [1] | [2] 90, 95 | [2] 85, 80 | 90 | [3] 90 | [3] 86 |
| Food processing: |  |  |  |  |  |
| Dog food— |  |  |  |  |  |
| Adhesion | 95 | 100 | 93 | 90 | 50 |
| Sulfide staining | 70 | 95 | 53 | 20 | 20 |
| Oxygenated spinach— |  |  |  |  |  |
| Adhesion | 99 | 100 | 28 | 75 | 35 |

[1] Punch press test for flexibility.
[2] Two ends rated.
[3] Average of three runs.

Examination of these data show that the coatings of this invention have fabricating properties comparable to the other products and greatly improved properties in the food processing tests.

*Example II*

A sodium dispersion was prepared by adding 7 grams of sodium to 100 ml. of n-decane and heating the mixture at 250 to 300° F. while stirring for 15 minutes at 10,000 r.p.m. The dispersion was transferred under dry nitrogen, while hot, to a one-gallon, stainless steel, jacketed autoclave provided with a stirrer. Two liters of n-heptane was also charged to the reactor and the mixture was heated to 190 to 200° F. after which a previously prepared mixture of 454 grams of butadiene and 50 grams of 2-methyl-5-vinylpyridine (weight ratio butadiene/2-methyl-5-vinylpyridine, 90.1/9.9) was introduced over a 1.5 hour period. The rate of introduction of the monomer mixture was such that the pressure was maintained at 10 to 20 p.s.i.g. The temperature during this period was 190 to 226° F. After all the monomer mixture was charged, methanol (1.5 equivalents based on the sodium) was added to inactivate the catalyst. The polymer solution was washed with three 400 to 800 ml. portions of distilled water and stripped to remove the n-heptane. The product had a viscosity of 5520 Saybolt Furol seconds at 100° F.

A toluene solution of the liquid butadiene/2-methyl-5-vinylpyridine copolymer of approximately 50 percent concentration was roller coated on one side of commercial electrolytic tin plate (½ pound of tin/base box). The coated plate was then baked 15 minutes at 400° F. Result of a pencil hardness test gave a value of 4.

Wedge bend tests were made to determine flexibility of the coating composition. To make the wedge bend test, strips 4 inches by 1½ inches were cut from the coated plate. The strips were then preformed, with the coated side up, by bending over a preformer made from a quarter inch rod. The strips were formed by placing them length-wise along the rod and bending them into a U-shape approximately ¾ inch on a side. These preformed strips were then placed in the wedge bend apparatus and a 3.5 pound weight was released from a height of 20 inches. The anvil on the wedge bend apparatus was designed so that one end of the preformed strip was mashed together and the other end retained the original U-shape.

The measurement reported was determined after placing the specimen in a 5 percent copper sulfate solution, to which a few drops of acid were added, for two minutes to develop the fracture of the coating after which the specimen was rinsed with tap water. The length of the continuous fracture was measured and recorded in inches. An average of four tests, expressed as sixteenths, was 7.

*Example III*

A sodium dispersion was prepared and transferred to a reactor as described in Example II. Two liters of n-heptane was also charged to the reactor and the mixture was heated to 190 to 200° F. after which a previously prepared mixture of 454 grams of butadiene and 23 grams of 2-methyl-5-vinylpyridine (weight ratio butadiene/2-methyl-5-vinylpyridine, 95.2/4.8) was introduced over a period of 85 minutes. The rate of introduction of the monomer mixture was such that the pressure was maintained at 10 to 20 p.s.i.g. The temperature during this period was 190 to 225° F. After all the monomer mixture was charged, 50 ml. of methanol was added and the polymer solution was washed with four 500 ml. portions of water and then stripped to remove the n-heptane. The product had a Gardner color of 14 and a Saybolt Furol viscosity at 100° F. of 3690 seconds.

A 50 percent toluene solution of the liquid copolymer was roller coated on one side of commercial electrolytic tin plate, as described in Example II, and baked 13 minutes at 400° F. An average of 10 wedge bend tests gave a value of 12. Punch press tests for determining flexibility of the coating were made as described in Example I. Each of the two can ends showed a rating of 95.

A solution of 4.5 pounds of liquid polybutadiene in 2.5 pounds of mineral spirits was roller coated onto electrolytic tin plate as described above and baked 13 minutes at 400° F. The film weight was 6.4 mg./sq. in. The pencil hardness of the film was 5 to 6 and an average of 10 wedge bend tests gave a value of 26.9. The liquid polybutadiene employed was prepared by mass polymerization using finely divided sodium as the catalyst. It had a viscosity of 1362 Saybolt Furol seconds at 100° F. and a Gardner color of 11.

*Example IV*

Three blends were prepared using the liquid butadiene/2-methyl-5-vinylpyridine copolymer and the liquid polybutadiene described in Example III.

The blends were prepared as follows:

(1) 150 grams copolymer
 150 grams liquid polybutadiene in toluene as a 50 percent solution
(2) 75 grams copolymer
 225 grams liquid polybutadiene in toluene as a 50 percent solution
(3) 37.5 grams copolymer
 262.5 grams liquid polybutadiene in toluene as a 50 percent solution Each of the compositions was roller coated on one side of commercial electrolytic tin plate, as described in Example II, and baked 13 minutes at 400° F. Properties of the coatings were determined. Results were as follows:

|  | Blends | | |
| --- | --- | --- | --- |
|  | 1 | 2 | 3 |
| Film weight, mg./sq. in | 4.3 | 3.4 | 3.4 |
| Pencil hardness | 4H | 5H | 6H |
| Wedge bend | [1] 16 | [2] 20 | [1] 21 |
| Punch press rating | 90, 95 | | |

[1] Average of 8 tests.
[2] Average of 7 tests.

*Example V*

Two blends were prepared using the liquid butadiene/2-methyl-5-vinylpyridine copolymer described in Example II and the liquid polybutadiene described in Example III. The blends were prepared as follows:

(1) 150 grams polymer
 150 grams liquid polybutadiene in toluene as a 50 percent solution
(2) 75 grams copolymer
 225 grams liquid polybutadiene in toluene as a 50 percent solution Each of the compositions was roller coated on one side of commercial electrolytic tin plate, as described in Example II, and baked 13 minutes at 400° F. Properties of the coatings were determined. Results were as follows:

|  | Blends | |
| --- | --- | --- |
|  | 1 | 2 |
| Film weight, mg./sq. in | 3.7 | 3.7 |
| Pencil Hardness | 3H | 4H |
| Wedge bend | [1] 15 | [1] 21 |

[1] Average of 8 tests.

*Example VI*

A liquid 1,3-butadiene/2-methyl-5-vinylpyridine copolymer was prepared by emulsion polymerization at 122° F. according to the following recipe:

| | Parts by weight |
| --- | --- |
| Water | 200 |
| 1,3-butadiene | 90 |
| 2-methyl-5-vinylpyridine | 10 |
| Alkali metal fatty acid soap | 3 |
| Potassium persulfate | 0.3 |
| Mixed tertiary mercaptans [1] | |

[1] A mixture of $C_{12}$, $C_{14}$, and $C_{16}$ tertiary mercaptans in a 3:1:1 ratio.

After approximately 60 percent conversion, the reaction was shortstopped with 0.2 part hydroquinone and 2 weight percent, based on the polymer, of phenyl-beta-naphthylamine was added as an antioxidant.

A coating composition was prepared by dissolving 5 grams of this copolymer in 50 grams of toluene. To this solution was added 45 grams of liquid polybutadiene prepared by sodium catalyzed polymerization having a viscosity of 1500 Saybolt Furol seconds at 100° F. in 100 grams of toluene. The mixture was applied to hot dipped and electrolytic tin plate by brushing and the coated plate baked 15 minutes at 400° F. The film weight in each case was 8.1 milligrams per square inch. The material was tested for flexibility, and gave a wedge bend result of 6 for the hot dipped plate and 12 for the electrolytic tin plate.

As many possible embodiments can be made of this invention without departing from the scope thereof, it is to be understood that all matter herein set forth should be interpreted as illustrative and not as unduly limiting the invention.

I claim:

1. A composition suitable for coating metal surfaces comprising (1) a liquid polymer prepared from a monomer system comprising, based on 100 parts by weight of monomers, 70 to 98 parts of a conjugated diene containing 4 to 12 carbon atoms and 30 to 2 parts of a compound selected from the group consisting of pyridine and quinoline containing a

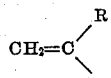

substituent wherein R is selected from the group consisting of hydrogen and methyl, said liquid polymer having a viscosity in the range of 100 to 6000 Saybolt Furol seconds at 100° F., and (2) a hydrocarbon solvent boiling the range of 175 to 400° F., the amount of said solvent being sufficient to give a solution containing 10 to 70 percent by weight of non-volatile matter.

2. The composition of claim 1 wherein said compound is 2-methyl-5-vinylpyridine.

3. The composition of claim 1 wherein said compound is 2-vinylpyridine.

4. A composition suitable for coating metal surfaces comprising a liquid polymer prepared by polymerizing, based on 100 parts of monomers, 70 to 98 parts of 1,3-butadiene with 30 to 2 parts of 2-methyl-5-vinylpyridine, said liquid polymer having a viscosity in the range of 100 to 6000 Saybolt Furol seconds at 100° F., and a hydrocarbon solvent boiling in the range of 175 to 400° F., the amount of said solvent being sufficient to give a solution containing 10 to 70 percent by weight of non-volatile matter.

5. The composition of claim 4 wherein said polymer is prepared by mass polymerization in the presence of sodium as the polymerization catalyst.

6. The composition of claim 4 wherein said polymer is prepared by emulsion polymerization.

7. A composition suitable for coating metal surfaces comprising a mixture of (A) a liquid homopolymer of a conjugated diene containing 4 to 12 carbon atoms, (B) a liquid polymer prepared from a monomer mixture comprising, based on 100 parts by weight of monomers, 70 to 98 parts of a conjugated diene, containing 4 to 12 carbon atoms and 30 to 2 parts of a compound selected from the group consisting of pyridine and quinoline containing a

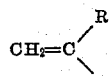

substituent wherein R is selected from the group consisting of hydrogen and methyl, each of said liquid polymers having a viscosity in the range of 100 to 6000 Saybolt Furol seconds at 100° F., and (C) a hydrocarbon solvent boiling in the range of 175 to 400° F., the amount of solvent being sufficient to give a solution containing 10 to 70 percent by weight of non-volatile matter.

8. A composition suitable for coating metal surfaces comprising a mixture of a liquid homopolymer of 1,3-butadiene, a liquid copolymer prepared from a monomer mixture comprising, based on 100 parts by weight of monomers, 70 to 98 parts of 1,3-butadiene and 30 to 2 parts of 2-methyl-5-vinylpyridine, each of said liquid polymers having a viscosity in the range of 100 to 6000 Saybolt Furol seconds at 100° F. and a hydrocarbon solvent boiling in the range of 175 to 400° F., the amount of solvent being sufficient to give a solution containing 10 to 70 percent by weight of non-volatile matter.

9. Tin plate having a baked coating thereon, said coating comprising a polymer prepared by polymerizing to a viscosity of 100 to 6000 Saybolt Furol seconds at 100° F. a monomer mixture containing, based on 100 parts by weight of monomers, 70 to 98 parts of a conjugated diene containing 4 to 12 carbon atoms and 30 to 2 parts of a compound selected from the group consisting of pyridine and quinoline containing a

substituent where R is selected from the group consisting of hydrogen and methyl.

10. Tin plate having a baked coating thereon, said coating comprising a polymer prepared by polymerizing to a viscosity of 100 to 6000 Saybolt Furol seconds at 100° F. a monomer mixture containing, based on 100 parts by weight of monomers, 70 to 98 parts of 1,3-butadiene and 30 to 2 parts of 2-methyl-5-vinylpyridine.

11. Tin plate having a baked coating thereon, said coating comprisnig a mixture of a homopolymer of a conjugated diene containing 4 to 12 carbon atoms and a polymer prepared from a monomer mixture comprising, based on 100 parts by weight of monomers, 70 to 98 parts of a conjugated diene containing 4 to 12 carbon atoms and 30 to 2 parts of a compound selected from the group consisting of pyridine and quinoline containing a

substituent where R is selected from the group consisting of hydrogen and methyl, each of said polymers, prior to mixing and baking, having a viscosity in the range of 100 to 6000 Saybolt Furol seconds at 100° F.

12. Tin plate having a baked coating thereon, said coating comprising a mixture of a homopolymer of 1,3-butadiene and a polymer prepared from a monomer mixture comprising, based on 100 parts by weight of monomers, 70 to 98 parts of 1,3-butadiene and 30 to 2 parts of 2-methyl-5-vinylpyridine, each of said polymers, prior to mixing and baking, having a viscosity in the range of 100 to 6000 Saybolt Furol seconds at 100° F.

13. A food container resistant to the action of foods and beverages, at least the inner surfaces having a baked coating thereon, said coating comprising a polymer prepared by polymerizing to a viscosity of 100 to 6000 Saybolt Furol seconds at 100° F. a monomer mixture containing, based on 100 parts by weight of monomers, 70 to 98 parts of a conjugated diene containing 4 to 12 carbon atoms and 30 to 2 parts of a compound selected from the group consisting of pyridine and quinoline containing a

substituent where R is selected from the group consisting of hydrogen and methyl.

References Cited in the file of this patent

UNITED STATES PATENTS

| | | |
|---|---|---|
| 2,479,409 | Roedel | Aug. 16, 1939 |
| 2,651,856 | Newton | Sept. 15, 1953 |
| 2,681,331 | Howland et al. | June 15, 1954 |
| 2,709,662 | Roenecke | May 31, 1955 |
| 2,753,385 | Gleason | July 3, 1956 |
| 2,757,162 | Howland et al. | July 31, 1956 |
| 2,797,207 | Burke | June 25, 1957 |